Figures 1, 2:
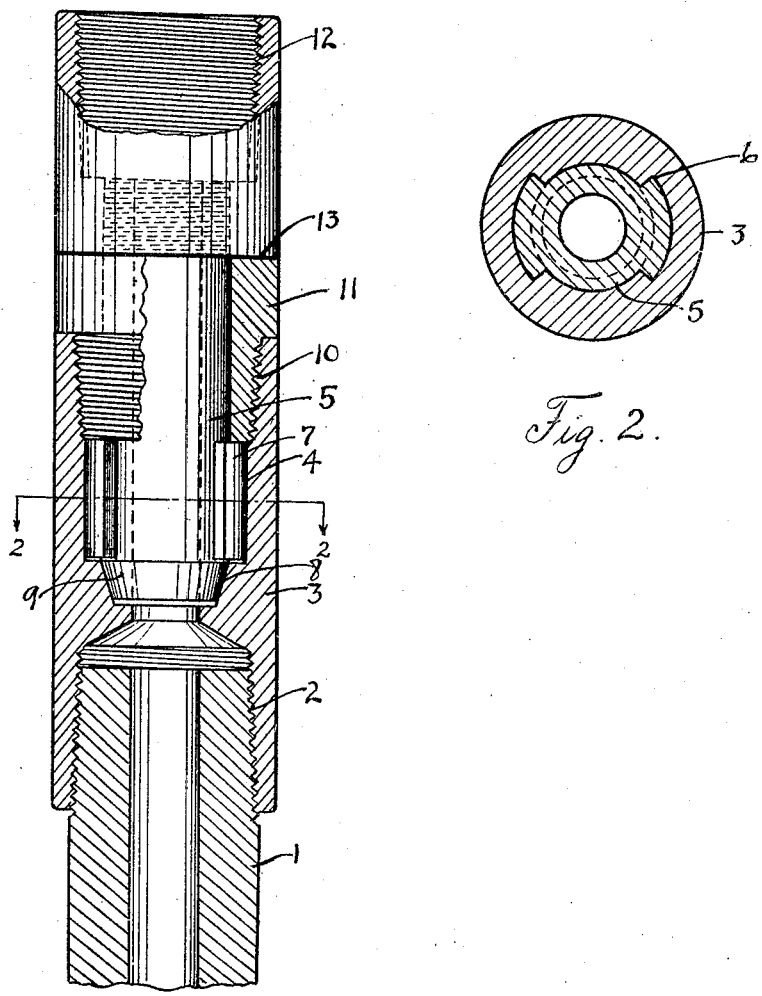

Oct. 19, 1926.

S. SORENSEN 1,603,721

TOOL JOINT

Original Filed Nov. 9, 1923

Sam Sorensen, Inventor

By Jesse R. Stone

Attorney

Patented Oct. 19, 1926.

1,603,721

UNITED STATES PATENT OFFICE.

SAM SORENSEN, OF HOUSTON, TEXAS, ASSIGNOR OF ONE-HALF TO HOWARD F. SMITH, OF HOUSTON, TEXAS.

TOOL JOINT.

Application filed November 9, 1923. Serial No. 673,700. Renewed September 7, 1926.

My invention is to an improvement in tool joint to be employed in coupling together and uncoupling the different lengths of drill stem employed in drilling wells.

In the usual type of tool joint employed in coupling together lengths of drill stem, there is a pin member threaded at its upper end for securing at one end of a length of drill pipe and the other end of which has a tapered coarse threaded pin for fitting within a threaded socket in the upper end of a box member, as also secured to the adjacent end of another length of drill pipe. It has been found an objection in the use of tool joints of this character that the torsional twist upon the drill stem results in screwing the pin member into the box member with so great force that they are subsequently released only with great difficulty.

It is an object of my invention to provide a means of securing the box and the pin member together whereby the torsional strain of the rotation of the drill stem shall be taken away from the threaded portion of the joint, thus eliminating the locking of the two parts in use.

It is another object of my invention to provide a tool joint which is composed of parts fitting closely together so that danger of leakage around the joint may be avoided.

Referring to the drawing herewith, wherein like numerals and references are employed to designate like parts in both views, Fig. 1 is a view partly in centrally longitudinal section showing a tool joint constructed in accordance with my invention. Fig. 2 is a transverse section of the plane 2—2 of Fig. 1.

In the drawing I have shown a length of drill stem 1 having the upper end threaded for connection within the socket 2 of the box member 3 of a tool joint. The said box member has a central passage therethrough and has its upper end recessed to provide a socket 4 to receive the lower end 5 of the pin member of the tool joint. The recess 4 is cylindrical in shape except for two opposite keyways 6, as shown in Fig. 2 which are shaped to receive laterally projecting keys 7 upon the pin member. As will be noted, these keyways are slightly dovetailed in shape so as to prevent relative movement of the pin member therein, in an obvious manner.

The lower end of the socket 4 is tapered downwardly at 8 to receive the tapered lower end 9 of the pin member. These parts are adapted to fit together on this point so that when forced into close contact there will be no danger of leakage around the two parts. This tapered portion 8 is in the shape of an inverted frustum of a cone. The upper end of the box member 3 is increased slightly in internal diameter and threaded at 10 to receive a tubular nut 11.

The pin member 5 is of the same external diameter as the box member at its upper end, and has a threaded socket 12 to receive adjacent drill stem, not shown. Below this upper end the diameter is reduced to provide a shoulder at 13 to contact with the upper end of the tubular nut 11 previously referred to. Below this the pin member is cylindrical to the lower end of said nut against which the upper ends of keys 7 may contact.

In constructing the pin member it is contemplated that the keys 4 will be secured to the pin member after the rotatable nut 11 has been placed above said keys. The nut 11 will therefore be rotatable upon a cylindrical portion of the pin member at all times.

In connecting the pin member and box member together the pin member is made to register with the opening 4 in the box member and is forced downwardly until the tapered portion 9 of the pin fits firmly in the seat 8. The nut 11 will then be in contact with the threaded portion of the box member, and because of its tapered fit a few rotations of the nut 11 will serve to secure the pin within the box in an obvious manner and it will be noted that when the nut is tightened in position, the lower end thereof will contact with the upper ends of the keys 7 and will tend to force the pin firmly downward so that the tapered portion 9 will make a water tight joint within the seat 8.

The advantages of this type of construction are that the torsional strain of rotation will not be exerted at all upon the threaded connection at 10. The keys 7 fitting within the keyways 4 will take up the strain of rotation and the threaded nut 11 will tend only to hold the parts from longitudinal movement. It will be easy therefore, when the joint is to be released to again rotate the nut 11 in the reverse direction, to unscrew the parts.

The thread at the lower end of the nut 11 will preferably be a so-called left hand thread so that the ordinary rotation of the tool joint will not tend to unscrew it when in use. It will therefore be possible to release these parts without undue exertion, and under ordinary circumstances a common wrench of the friction type will easily unscrew the nut from the box member, thereby releasing the two parts of the joint.

The further advantages of this improvement will be obvious to one skilled in the art without further description.

What I claim as new and desire to protect by Letters Patent is:

1. In a tool joint, a box member having a central passage therethrough, a threaded seat in one end to receive a pipe section, a socket in the other end of said box, lateral keyways centrally thereof, a taper threaded recess at the outer end of said socket, a pin member having a lower cylindrical pin, lateral keys on said pin to fit within said keyways, and a tapered threaded nut on said pin, rotatable for engagement in said socket, said nut having an inner ring engaging above said keys to prevent removal of said ring from said pin member.

2. In a tool joint, a box member threaded at its lower end for attachment to a pipe, a cylindrical socket at its upper end, lateral keyways in said socket, the lower end of said socket having a downwardly tapered seat and its upper end flared outwardly and threaded, a pin member shaped to fit said socket and seat, keys thereon to fit said keyways, a threaded nut rotatable on said pin member above said keys and retained against removal thereon by said keys, said nut adapted to engage said flared upper end in said box member in the manner and for the purpose described.

3. In a tool joint, a box member threaded at its lower ends, a cylindrical socket at its upper end, laterally extending keyways in said socket, a tapered seat below said keyways, a flaring threaded mouth at the upper end of the cylindrical socket, a pin member shaped to fit said socket and seat, keys thereon fitting said keyways, and a ring nut on said pin above said keys rotatable on said pin, and means to prevent removal of said nut therefrom, said nut being adapted to engage said mouth.

In testimony whereof I hereunto affix my signature this 5th day of November, A. D. 1923.

SAM SORENSEN.